United States Patent
Tanaka et al.

(10) Patent No.: US 9,598,823 B2
(45) Date of Patent: Mar. 21, 2017

(54) STOP POSITION DETERMINING DEVICE FOR TRANSPORT VEHICLE AND TRANSPORT VEHICLE WITH THE SAME

(71) Applicant: Hitachi Construction Machinery Co., Ltd., Tokyo (JP)

(72) Inventors: Wataru Tanaka, Tokyo (JP); Masanori Ichinose, Tokyo (JP); Yukihiko Ono, Tokyo (JP); Shinjiro Saito, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/837,540

(22) Filed: Aug. 27, 2015

(65) Prior Publication Data

US 2016/0090700 A1  Mar. 31, 2016

(30) Foreign Application Priority Data

Sep. 29, 2014  (JP) .................. 2014-199435

(51) Int. Cl.
| | | |
|---|---|---|
| *G01C 21/00* | (2006.01) | |
| *E01C 19/00* | (2006.01) | |
| *B60T 7/22* | (2006.01) | |
| *B60W 30/18* | (2012.01) | |
| *B60W 40/06* | (2012.01) | |
| *G05D 1/02* | (2006.01) | |
| *E02F 3/84* | (2006.01) | |
| *E02F 9/20* | (2006.01) | |

(52) U.S. Cl.
CPC .............. *E01C 19/004* (2013.01); *B60T 7/22* (2013.01); *B60W 30/181* (2013.01); *B60W 30/18036* (2013.01); *B60W 30/18109* (2013.01); *B60W 40/06* (2013.01); *E02F 3/841* (2013.01); *E02F 9/2045* (2013.01); *G05D 1/0225* (2013.01); *B60T 2201/022* (2013.01); *B60W 2300/125* (2013.01); *B60W 2550/10* (2013.01); *B60Y 2200/142* (2013.01)

(58) Field of Classification Search
CPC .......... E01C 13/00; E01C 13/12; E01C 15/00; E01C 17/00; E01C 19/00; E01C 19/004; E01C 19/006; E01C 19/008; E01C 19/08; E01C 23/06; B60T 1/00; B60T 1/02; B60T 1/06; B60T 3/00; B60T 5/00; B60T 7/18; B60T 8/00; B60T 7/22; B60T 8/24; B60T 7/16
USPC ........................... 701/532, 301, 50; 340/436
See application file for complete search history.

(56) References Cited

U.S. PATENT DOCUMENTS

| 7,529,640 B2 * | 5/2009 | Fujiwara | .................. G01C 9/00 702/127 |
|---|---|---|---|
| 2016/0236616 A1 * | 8/2016 | Kurihara | ................... E02F 9/24 |

FOREIGN PATENT DOCUMENTS

| JP | 2007-090939 | * | 4/2007 |
|---|---|---|---|
| JP | 2007-090939 A | | 4/2007 |

* cited by examiner

*Primary Examiner* — Muhammad Shafi
(74) *Attorney, Agent, or Firm* — Mattingly & Malur, PC

(57) ABSTRACT

To make a transport vehicle stop close to a bund in dependence on the shape of the bund. A stop position determining device for a transport vehicle includes: a bund identification module (520) that identifies the shape of a bund (400) provided on a traveling surface based on information from an external sensor (231) provided on the transport vehicle; and a target stop position calculation module (530) that calculates a target stop position (SP) for the transport vehicle based on the shape of the bund identified by the bund identification module.

1 Claim, 18 Drawing Sheets

| LINK ID | HEAD NODE ID | END NODE ID | ROUTE DEMAND VEHICLE SPEED | ROAD WIDTH | GRADIENT | CURVATURE |
|---|---|---|---|---|---|---|
| 21A | $(X_{22A}, Y_{22A})$ | $(X_{22B}, Y_{22B})$ | $V_{21A}$ | $W_{21A}$ | $S_{21A}$ | $C_{21A}$ |
| 21B | $(X_{22B}, Y_{22B})$ | $(X_{22C}, Y_{22C})$ | $V_{21B}$ | $W_{21B}$ | $S_{21B}$ | $C_{21B}$ |

STOP POSITION DETERMINING DEVICE FOR TRANSPORT VEHICLE AND TRANSPORT VEHICLE WITH THE SAME

BACKGROUND

1. Field of the Invention

The present invention relates to a stop position determining device for a transport vehicle and further, to a transport vehicle with the device.

2. Description of the Related Art

In open pit mines or the like, a transport vehicle such as a dump truck travels for transporting evacuated ore or earth and sand. The transport vehicle loads the transport object on its vessel (body) at a loading site and transports the loaded transport object to an earth dumping site to perform earth discharging. A bund for restraining the transport vehicle from traveling outside a traveling area is disposed at the earth dumping site. At this time, there arises a case where the transport object on the vessel is discharged outside the bund after the transport vehicle is stopped near the bund.

A technology for stopping a vehicle near a bund is known from Japanese Patent Application Publication No. 2007-90939 for example. This application discloses a technology "that is provided with image pickup means for taking an image in a traveling direction of a vehicle, bird's-eye view conversion means for generating a bird's-eye view image from the taken image, display means for displaying the bird's-eye view image, image analyzing means for calculating the position of a bund from the generated bird's-eye view image, tire position calculation means for calculating the position of tires in the bird's-eye view image, output image preparation means for preparing an output image in which a tire image and a bund position display image are depicted in correspondence to the calculated tire position and the analyzed bund position, and image control means for displaying the output image and the bird's-eye view image with the both images overlapped on the display means" (refer to Abstract).

In discharging the transport object at an earth dumping site of a mine or the like, it is desirable that a transport vehicle be stopped as close to a bund as possible. However, the shapes of bunds vary from mine to mine, and hence, there arises a case where the stop position of the transport vehicle has to be altered in dependence on the shape of the bund. Further, in mines or the like, there arises a case where the shape of a bund is changed in dependence on the operations of the transport vehicle. Therefore, there arises a case where the stop position of the transport vehicle has to be altered with the change in shape of the bund. However, in the aforementioned Japanese application, nothing is taken into consideration about stopping the vehicle close to the bund in dependence on the shape of the bund.

The present invention has been made taking the aforementioned circumstances into consideration, and it is an object of the present invention to make a transport vehicle stop close to a bund in dependence on the shape of the bund.

SUMMARY

In order to accomplish the aforementioned object, a stop position determining device for a transport vehicle according to the present invention comprises a bund identification module that identifies the shape of a bund provided on a traveling surface based on information from an external sensor provided on the transport vehicle and a target stop position calculation module that calculates a target stop position for the transport vehicle based on the shape of the bund identified by the bund identification module.

According to the present invention, it is possible to stop the transport vehicle close to the bund in dependence on the shape of the bund. The foregoing and other objects, constructions and many of the attendant advantages of the present invention may readily be appreciated from the description of the following preferred embodiments.

BRIEF DESCRIPTION OF THE DRAWINGS

Non-limiting and non-exhaustive embodiments of the present embodiments are described with reference to the following FIGURES, wherein like reference signs refer to like parts throughout the various views unless otherwise specified.

FIG. 3A and FIG. 3B are block diagrams showing hardware configurations of a control server and a dump truck, wherein FIG. 3A shows the control server, while FIG. 3B shows the dump truck.

FIG. 5A and FIG. 5B are a chart and a table showing one example of route data stored in the control server, wherein FIG. 5A schematically shows the route data, while FIG. 5B shows a data structure example of the route data.

FIG. 16 is an illustration showing one example where the bund is a structure made by concrete or the like.

DETAILED DESCRIPTION

Hereafter, embodiments of the present invention will be described with reference to the drawings. The following description is directed to concrete examples of the content of the present invention, and the present invention is not limited to the following description and may be subjected, within the scope of the technical concept disclosed in the present specification, to various alterations and modifications made by a person skilled in the art. In all drawings for describing the present invention, the same reference signs are indicative in the case of same function, and repeat description is omitted.

First Embodiment

Figure 1:
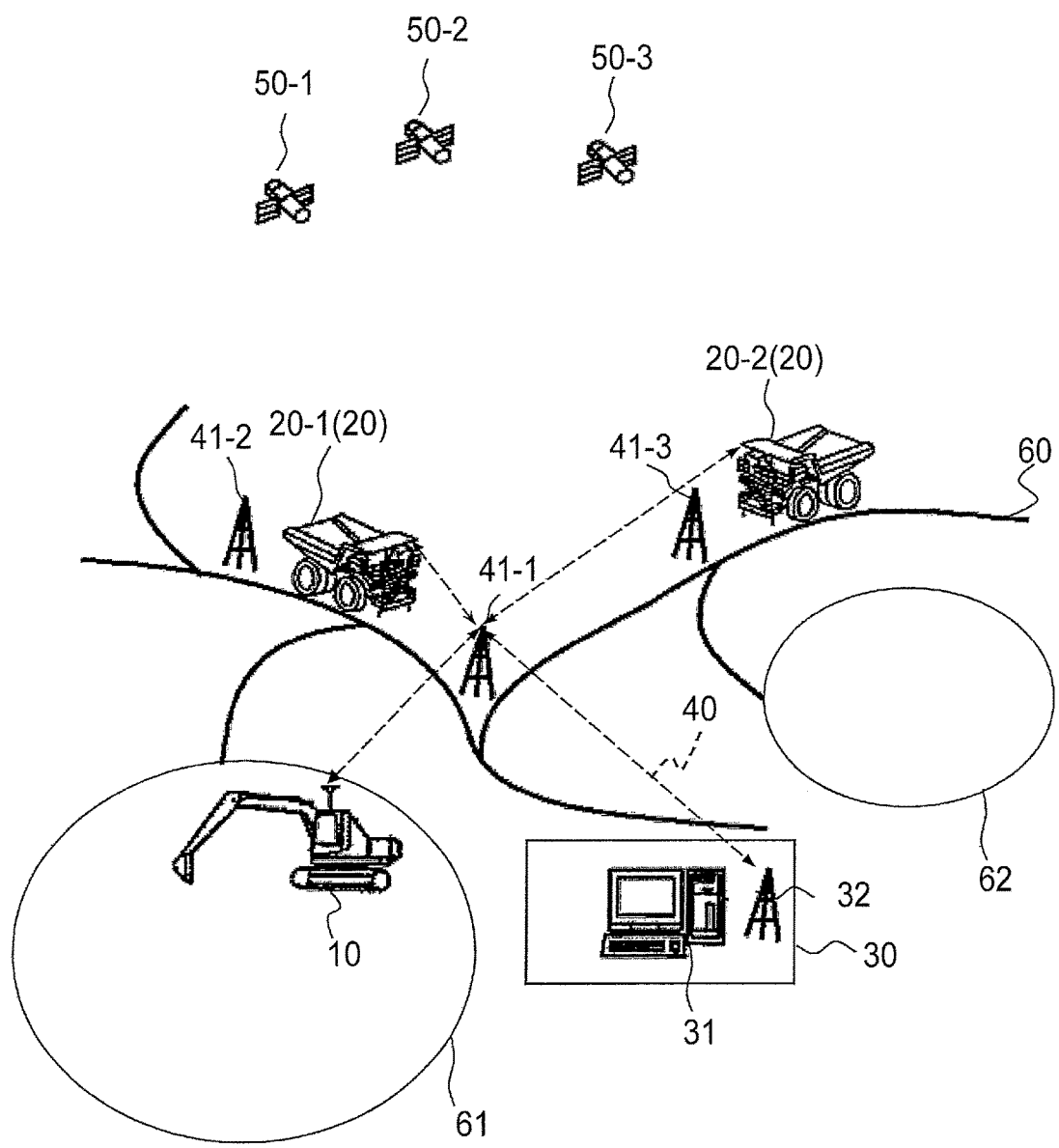
FIG. 1 is an illustration showing a schematic construction in a mining filed.
Figure 2:
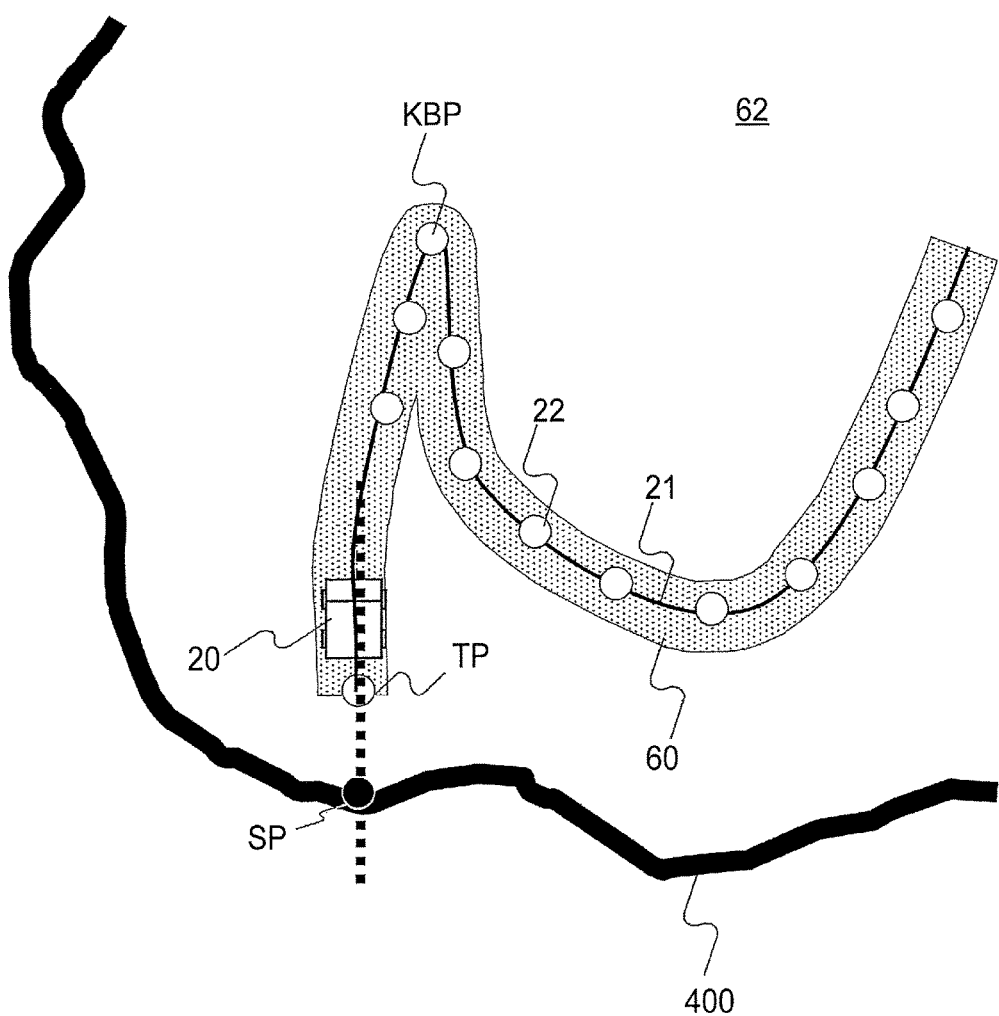
FIG. 2 is an illustration showing a traveling route for a dump truck in an earth dumping site shown in FIG. 1.

With reference to FIG. 1 and FIG. 2, description will be made regarding the schematic construction of a mining field in which a mining dump truck travels as a transport vehicle on which a stop position determining module is mounted according to the present embodiment. FIG. 1 is an illustration showing the schematic construction of the mining field, and FIG. 2 is an illustration showing a traveling route for the dump truck at an earth dumping site.

As shown in FIG. 1, in the mining field, there is provided a traveling route 60 connecting a loading site 61 and an earth dumping site 62. At the loading site 61, a power shovel 10 that performs loading operations for earth and sand or ore performs excavation operations. Then, dump trucks 20-1, 20-2 are loaded at the loading site 61 with loads such as earth and sand or ore by the power shovel 10 and then, autonomously travel along the traveling route 60 toward the earth dumping site 62. Upon arriving at the earth dumping site 62, the dump trucks 20-1, 20-2 discharge the loads. In the following description, the dump truck is designated as the dump truck 20 unless the dump trucks 20-1 and 20-2 are discriminated from each other.

At the earth dumping site 62, as shown in FIG. 2, the dump truck 20 autonomously travels on the traveling route 60 and switches the traveling direction from a forward movement to a reverse movement at a reversing point KBP to go back to a target point TP on the basis of map information and finally moves to and stops at a target stop position SP where a bund 400 is provided. Thereafter, the dump truck 20 performs an earth discharging operation and then travels toward the loading site 61 with itself unloaded. The traveling of the dump truck 20 from the target position TP to the target stop position SP is controlled based on sensor information from an external sensor 231 (refer to FIG. 3 and the like). The details of this control will be described later.

The dump trucks 20-1, 20-2 are connected by telecommunication to a control server 31 installed in a control center 30 via a radio communication channel 40. Thus, the dump trucks 20-1, 20-2 travel under the control of the control server 31. The numeral 32 in FIG. 1 denotes a radio communication antenna connected to the control server 31, and numerals 41-1, 41-2 and 41-3 denote radio mobile stations.

The dump truck 20 is provided with a position calculation device (not shown in FIG. 1) for receiving positioning radio waves from at least three navigation satellites 50-1, 50-2 and 50-3 of a global navigation satellite system (GNSS) to obtain the position of its own vehicle. As the GNSS, besides GPS, there may be used GLONASS or GALILEO.

The control server 31 is able to take into account travelling positions and target routes of all of the dump trucks 20-1, 20-2 and the operation goal and operation efficiency of the mine, calculate (determines) controlled demand vehicle speeds being the vehicle speeds (scalar quantities) that the control server 31 wants to apply to the respective dump trucks 20-1, 20-2 during the traveling thereof, and inform the respective dump trucks 20-1, 20-2 of the controlled demand vehicle speeds.

Figure 3A:
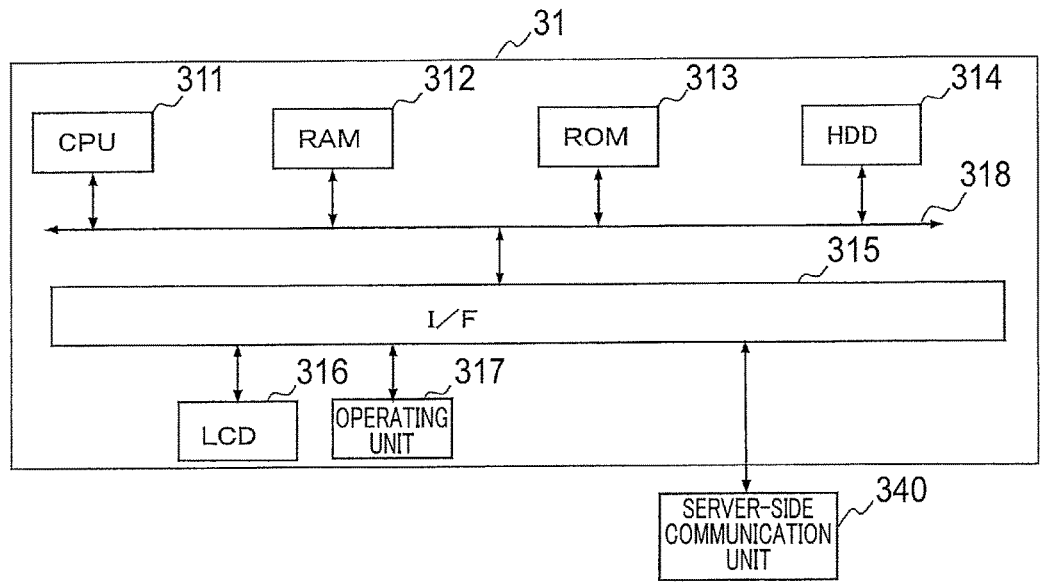
Figure 3B:
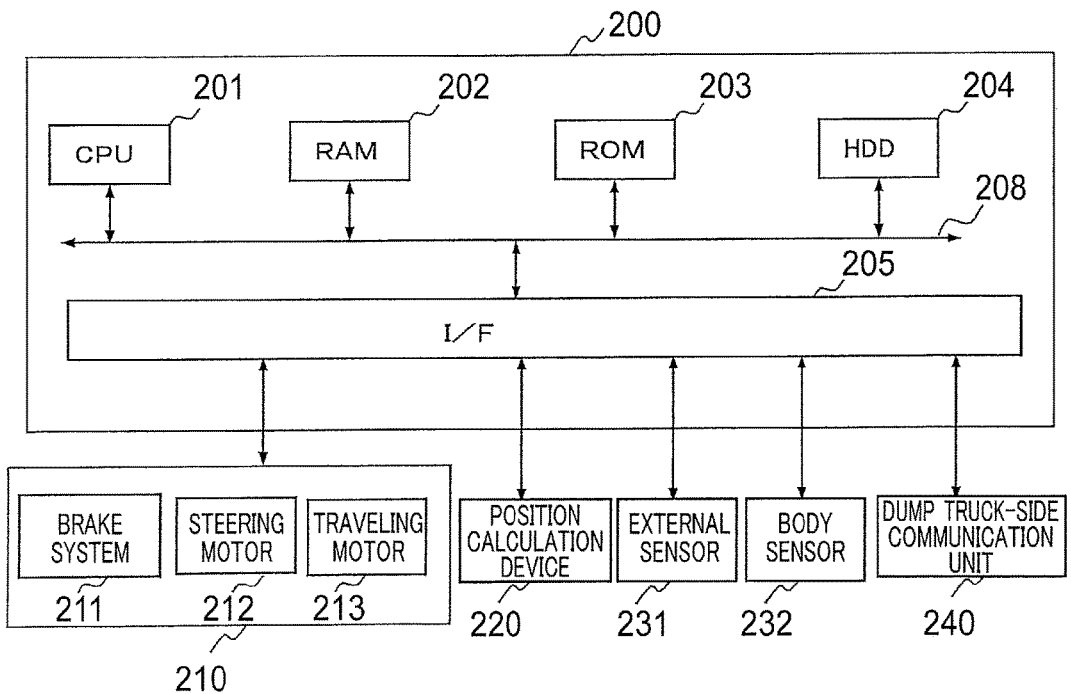

Next, electric configurations of the control server 31 and the dump truck 20 shown in FIG. 1 will be described with reference to FIG. 3A and FIG. 3B. FIG. 3A and FIG. 3B are block diagrams showing the hardware configurations of the control server 31 and the dump truck 20, respectively, wherein FIG. 3A represents the control server 31, whereas FIG. 3B represents the dump truck 20.

As shown in FIG. 3A, the control server 31 includes a CPU 311, a RAM (Random Access Memory) 312, a ROM (Read-Only Memory) 313, an HDD (Hard Disk Drive) 314, an I/F (Interface) 315, and a bus 318, and is configured by having the CPU 311, the RAM 312, the ROM 313, the HDD 314 and the I/F 315 connected with one another through the bus 318.

Further, the control server 31 is provided with an LCD (Liquid Crystal Display) 316 and an operating unit 317, which are connected to the I/F 315.

The CPU 311 is an arithmetic logical unit, which controls the whole operations of the control server 31.

The RAM 312 is a volatile storage medium capable of performing high-speed reading and writing of information and is used as working areas when the CPU 311 processes information.

The ROM 313 is a non-volatile storage medium for read-only use and stores therein an autonomous traveling control program featuring the present embodiment.

The HDD 314 is a non-volatile storage medium capable of reading and writing information and stores therein an OS (Operating System), various control programs, application programs and the like.

The LCD 316 is a visual user interface for enabling a user to confirm the traveling states of the dump trucks 20 in the mining field.

The operating unit 317 is a user interface such as a keyboard or a touch panel (not shown) laminated on the LCD 316 for enabling the user to input information to the control server 31.

A server-side communication unit 340 for connection to the radio communication channel 40 is connected to the I/F 315 of the control server 31.

On the other hand, as shown in FIG. 3B, the dump truck 20 is provided with a traveling control device 200 for executing a control processing for autonomous traveling, a traveling drive device 210 for driving the traveling of the dump truck 20 in accordance with control instructions from the traveling control device 200, a position calculation device 220 for calculating estimated positions of its own vehicle of the dump truck 20, an external sensor 231 such as a laser sensor for recognizing surrounding circumstances of the dump truck 20, a body sensor 232 for recognizing vehicle information on a vehicle tilt, a load or the like, and a dump truck-side communication unit 240 for connection to the radio communication channel 40.

The traveling drive device 210 includes a brake system 211 for putting a brake on the dump truck 20, a steering motor 212 for altering the steering angle of the dump truck 20, and a traveling motor 213 for making the dump truck travel.

The position calculation device 220 is a GPS device or an IMU for calculating estimated positions of its own vehicle upon receiving positioning radio waves from the navigation satellites 50-1, 50-2 and 50-3.

The traveling control device 200 includes a CPU 201, a RAM 202, a ROM 203, an HDD 204, an I/F 205, and a bus 208, and is configured by having the CPU 201, the RAM 202, the ROM 203, the HDD 204 and the I/F 205 connected with one another through the bus 208. Further, the I/F 205 is connected to the traveling drive device 210, the position calculation device 220, the external sensor 231, the body sensor 232 and the dump truck-side communication unit 240.

In the hardware configuration like this, an autonomous traveling control program stored in a storage medium such as the ROMs 203, 313 or the HDDs 204, 314 or an optical disk (not shown) is read out into the RAMS 202, 312 and is executed under the control of the CPUs 201, 311. Thus, the autonomous traveling control program (software) and the hardware are brought into cooperation to constitute functional blocks that realize the functions of the control server 31 and the traveling control device 200. Although in the present embodiment, the configurations of the control server 31 and the traveling control device 200 are described as software-hardware combinations, the function of, in particular, the dump truck 20 may be configured by the use of logic circuits that realize the function of the autonomous traveling control program executed on the dump truck side.

Figure 4:
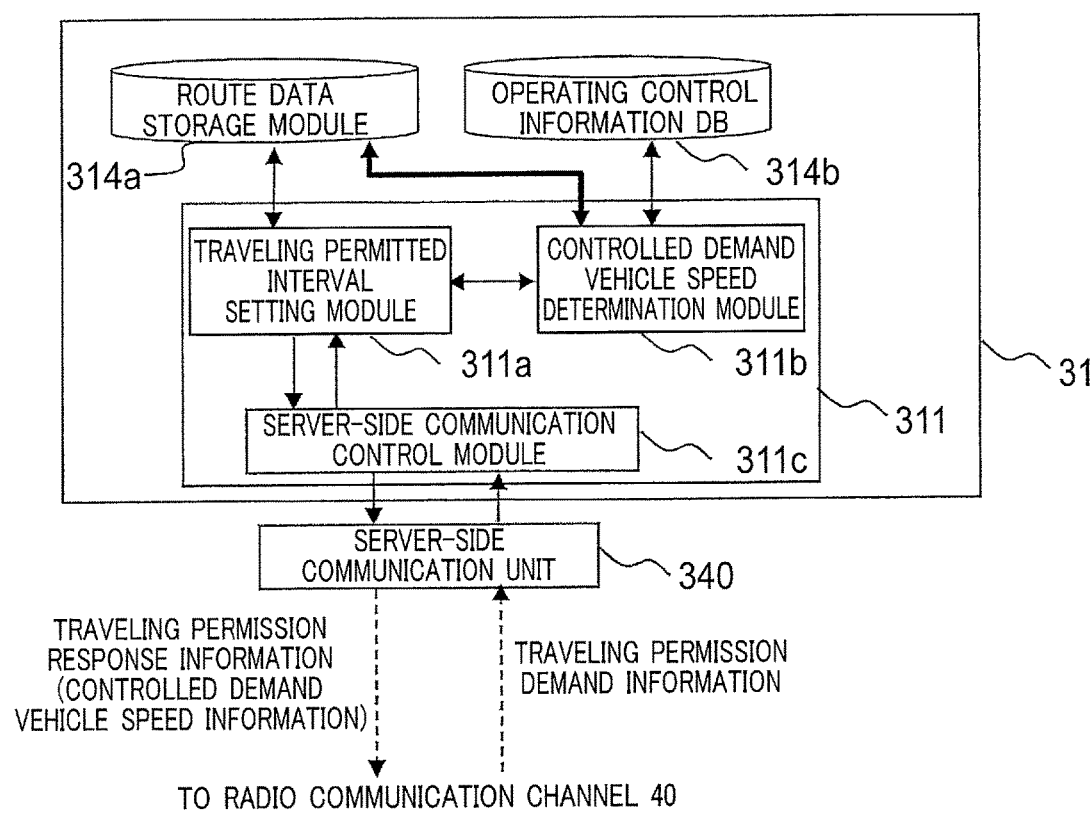
FIG. 4 is a functional block diagram showing primary functions of the control server.
Figures 5A, 5B:
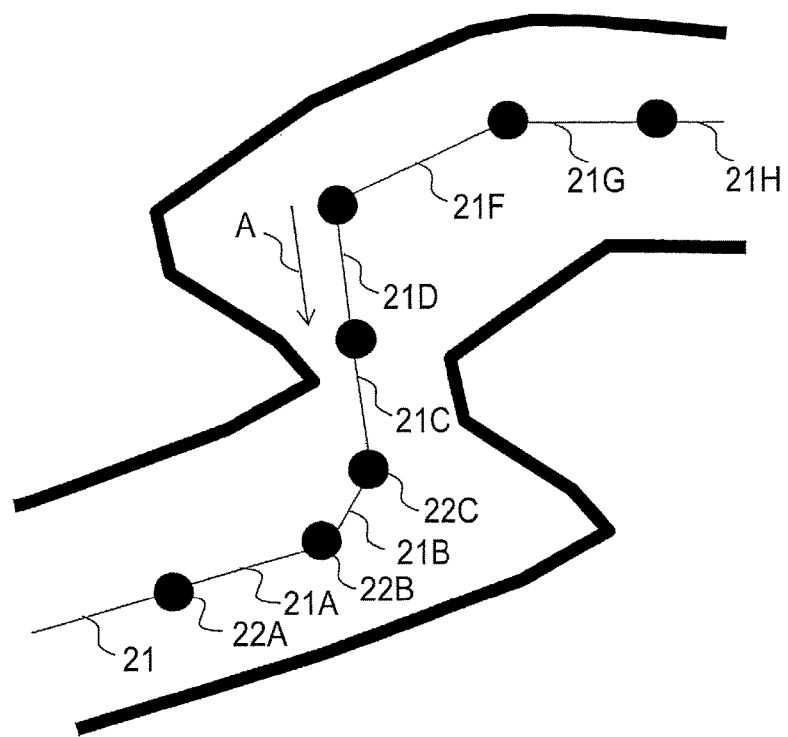

Next, the functional configuration of the control server 31 will be described with reference to FIG. 4, FIG. 5A and FIG. 5B. FIG. 4 is a functional block diagram showing primary functions of the control server 31. FIG. 5A and FIG. 5B are a chart and a table showing one example of route data stored in the control server 31, wherein FIG. 5A schematically shows the route data, whereas FIG. 5B shows a data structure example of the route data.

As shown in FIG. 4, the control server 31 is provided with a traveling permitted interval setting module 311a, a controlled demand vehicle speed determination module 311b, a server-side communication control module 311c, a route data storage module 314a, and an operating control information data base (hereinafter, the data base is abbreviated as "DB") 314b. The traveling permitted interval setting module 311a, the controlled demand vehicle speed determination module 311b and the server-side communication control module 311c are configured by the autonomous traveling control program executed by the control server 31.

The route data storage module 314a is configured by the use of a storage device of a fixed storage type such as the HDD 314. As shown in FIG. 5A, the route data is defined by position information on respective points (hereafter called "nodes") 22 on the traveling route 60 and links 21 connecting the respective nodes 22. Further, the route data may include topographic information of the mine and absolute coordinates (three-dimensional actual coordinates calculated based on the positioning radio waves) of the respective nodes 22. Each node 22 is given identification information (hereafter called "node ID") for uniquely identifying the node 22.

Each link 21 has a forward direction (the arrow A direction in FIG. 5A) and also has a head node and an end node defined. Then, as shown in FIG. 5B, in the route data, a link ID (e.g., 21A) being identification data for uniquely identifying each link is correlated with data that includes coordinate values $(X_{22A}, Y_{22A})$ of a head node ID and coordinate values $(X_{22B}, Y_{22B})$ of an end node ID for the link and a route demand vehicle speed $V_{21A}$, a road width $W_{21A}$, a gradient $S_{21A}$, and a curvature $C_{21A}$ at the time of traveling on the link.

The route demand vehicle speed is determined in dependence on a road specification such as the gradient, curvature and road width of the route. The route demand vehicle speed becomes a possible target vehicle speed at the time of actual traveling of the dump truck 20.

The operating control information DB 314b stores operation control information indicating the positions of the respective dump trucks 20 traveling on the traveling route 60.

The traveling permitted interval setting module 311a responds to traveling permission demand information transmitted from each dump truck 20 and sets the next traveling permitted interval to the dump truck 20. Specifically, with reference to the operation control information in the operating control information DB 314b, the traveling permitted interval setting module 311a grasps the position of the other dump truck traveling ahead of the dump truck 20 concerned. Then, with reference to the route data in the route data storage module 314a, the traveling permitted interval setting module 311a sets a forward boundary point of a newly set traveling permitted interval at a point that is behind by a distance (stop enabling distance) which is necessary at least for the dump truck 20 to be braked and stopped, from the present position of the other dump truck traveling ahead thereof on the traveling route 60. Further, the traveling permitted interval setting module 311a sets a rearward boundary point at a position that is spaced by the stop enabling distance from the present position of the dump truck 20 concerned. Then, the traveling permitted interval setting module 311a sets the interval between the forward boundary point and the rearward boundary point as a new traveling permitted interval that is given to the dump truck 20 issuing the traveling permission demand.

The controlled demand vehicle speed determination module 311b determines a controlled demand vehicle speed. Specifically, the controlled demand vehicle speed determination module 311b reads out route data from the route data storage module 314a and, with reference to the operating information stored in the operating control information DB 314b, determines a controlled demand vehicle speed taking into account a route demand vehicle speed set in correspondence to a link that is included in the new traveling permitted interval having been set for the dump truck 20, a distance of the dump truck 20 from the vehicle ahead, and the state of traffic congestion. Usually, the maximum controlled demand vehicle speed is the vehicle speed that is made to correspond to each link in the route data, and in the case of traffic congestion, a vehicle speed that is slower than the maximum controlled demand vehicle speed is determined as the controlled demand vehicle speed. The controlled demand vehicle speed is outputted to the traveling permitted interval setting module 311a.

The traveling permitted interval setting module 311a generates traveling permission response information that indicates the forward boundary point and the rearward boundary point of the set new traveling permitted interval and the controlled demand vehicle speed, and outputs the generated information to the server-side communication control module 311c.

The server-side communication control module 311c controls receiving the traveling permission demand information for each dump truck 20 and transmitting the traveling permission response information generated in response to the traveling permission demand information.

Figure 6:
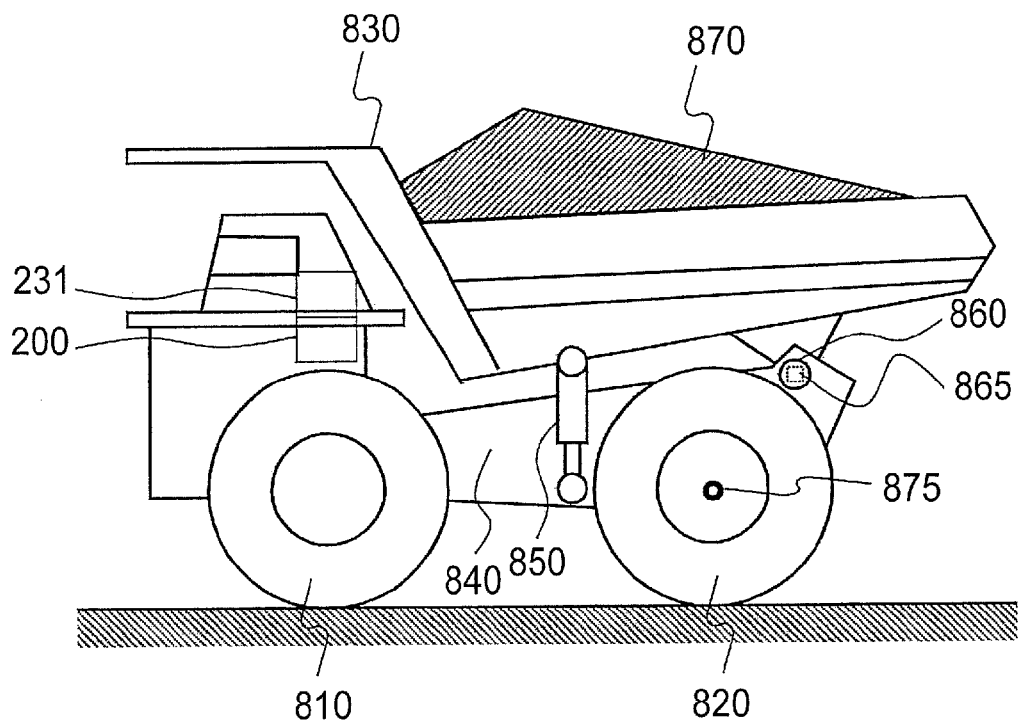
FIG. 6 is a side view showing the entire construction of the dump truck.

Next, description will be made regarding functional configurations relating to the entire construction of the dump truck 20 and the autonomous traveling of the dump truck 20. FIG. 6 is a side view showing the entire construction of the dump truck 20, and FIG. 7 is a block diagram showing the functional configuration of the dump truck 20.

As shown in FIG. 6, the dump truck 20 is provided with front wheels 810 and rear wheels 820 attached to front and rear parts of a body frame 840, a vessel 830 rotatably supported on the body frame 840 through a support shaft 860, a hoist cylinder 850 for pivotally moving the vessel 830 about the support shaft 860 when telescopically operated, the external sensor 231 for detecting the bund 400 (refer to FIG. 9) when the dump truck 20 moves, and the traveling control device 200 for controlling the traveling of the dump truck 20.

The body frame 840 has primary components such as a drive system and a driver's seat mounted thereon, and the vehicle is configured to be able to travel freely on the traveling surface by the provision of the front wheels 810 and the rear wheels 820. When the hoist cylinder 850 is telescopically extended, the vessel 830 is operated to elevate a front end and increase the slant angle as the pivot movement is effected about the support shaft 860 and thus, is able to discharge the load (transport object) 870 loaded on the vessel 830 from an rear end of the same (refer to FIG. 10). Further, a potentiometer (rotary potentiometer) 865 for measuring the rotational angle of the support shaft 860 is set on the support shaft 860 as angle detection means for detecting the slant angle of the vessel 830 relative to the body frame 840. The numeral 875 denotes a rear wheel axle of the rear wheels 820. It is to be noted that the traveling drive device 210, the position calculation device 220, the body sensor 232 and the dump truck-side communication unit 240 that are shown in FIG. 3B are omitted in FIG. 6.

Figure 7:
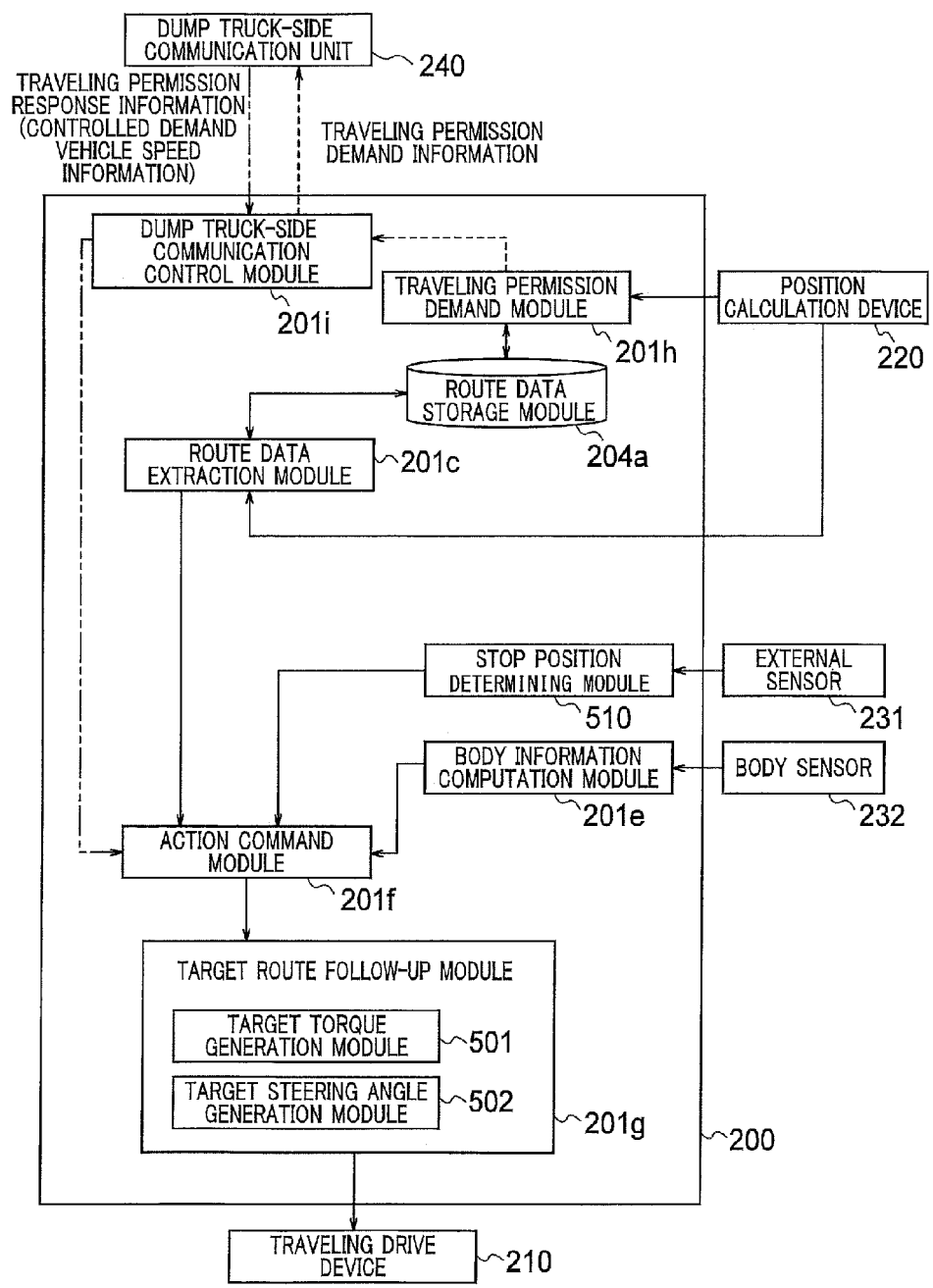
FIG. 7 is a block diagram showing the internal configuration of the dump truck.

As shown in FIG. 7, the traveling control device 200 is provided with a route data storage module 204a storing the traveling route and its attendant information, a route data extraction module 201c for extracting appropriate data from the route data storage module 204a, a stop position determining module (stop position determining device) 510 for calculating a stop position for the dump truck 20, and a body information computation module 201e for recognizing the body state such as a traveling speed, a steering angle and a live load. The traveling control device 200 is further provided with an action command module 201f for determining a target vehicle speed, a target route and the like for its own vehicle to output command information that is necessary for its own vehicle to follow the target route, a target route follow-up module 201g for determining control variables for driving, braking and steering that are necessary for its own vehicle to move along a target route at a target vehicle speed, a traveling permission demand module 201h for demanding the setting of a new traveling permitted interval for the next traveling when its own vehicle comes close to an end point (forward boundary point) of the traveling permitted interval during the ongoing traveling, and a dump truck-side communication control module 201i for executing radio communication control with the control server 31.

The route data storage module 204a records route data expressing a route along which the dump truck 20 is to travel, as aggregate of links each having points called nodes at opposite ends. Further, each link ID and its attendant information attendant thereupon are configured to be associated so that the designation of a link makes it possible to extract data tied to the link.

The route data extraction module 201c uses the position information calculated by the position calculation device 220 as a base for extracting route data that expresses the neighborhood of the calculated position. The route data extraction module 201c outputs the extracted route data to the action command module 201f.

As described later in detail, the stop position determining module 510 discriminates the presence/absence and the shape of an obstacle that exists particularly ahead in the traveling direction of the dump truck 20 (for example, the vehicle ahead, the bund 400 or the like) based on an output from the external sensor 231 such as a laser sensor, and where the obstacle is the bund 400, calculates a target stop position for stopping the dump truck 20 in the neighborhood of the bund 400. Then, the stop position determining module 510 outputs a calculation result to the action command module 201f. As the external sensor 231, besides the laser sensor, there may be used a millimeter-wave sensor, a stereo camera or the like.

The body information computation module 201e computes values representing the body state of the dump truck 20 such as a steering angle, a traveling speed and a live load based on the outputs from various body sensors 232. For example, the body information computation module 201e computes a steering angle based on the output from a rotary angle sensor attached to a steering shaft. Further, the body information computation module 201e computes a traveling speed based on rotational speeds outputted from wheel speed sensors measuring the rotational speeds of the front wheels 810 and the rear wheels 820 as well as on the tire specification.

Furthermore, the body information computation module 201e computes a live load based on the outputs from pressure sensors capable of measuring the pressures in suspensions installed for the respective wheels. The action command module 201f responds to the detection result to perform a traveling control corresponding to the body information, for example, to advance the braking timing earlier in the case of empty load than in the case of being loaded.

The target route follow-up module 201g is for executing a control that makes the dump truck 20 travel along the target route at the target vehicle speed determined by the action command module 201f and includes a target torque generation module 501 for generating a traveling motor torque command needed to realize a target vehicle speed and a target steering angle generation module 502 for generating a steering angle command to realize a target route.

The target torque generation module 501 obtains a target vehicle speed from the action command module 201f, feeds back the difference between the target vehicle speed and the present vehicle speed, and generates a target traveling torque to decrease the difference. The target steering angle generation module 502 obtains traveling permission response information and position information on a target route (traveling permitted interval) from the dump truck-side communication control module 201i and generates a target steering angle so that the dump truck 20 does not deviate from the target route.

The target route follow-up module 201g also has a function of controlling the traveling drive device 210 in accordance with a command from the action command module 201f when the dump truck 20 is to move to the target stop position SP close to the bund 400 for earth discharging.

The traveling permission demand module 201h compares the position data of its own vehicle obtained from the position calculation device 220 with the route data read out from the route data storage module 204a, judges whether or not its own vehicle has arrived at the point (traveling permission demand point) where the traveling permission demand information is to be transmitted for demanding the setting of the next traveling permitted interval, and in the case of having arrived, transmits the traveling permission demand information to the dump truck-side communication control module 201*i*.

The dump truck-side communication control module 201*i* performs the control of transmitting to the control server 31 the traveling permission demand information for demanding the next traveling permitted interval and of receiving the traveling permission response information (including controlled demand vehicle speed information) from the control server 31.

Figure 8:
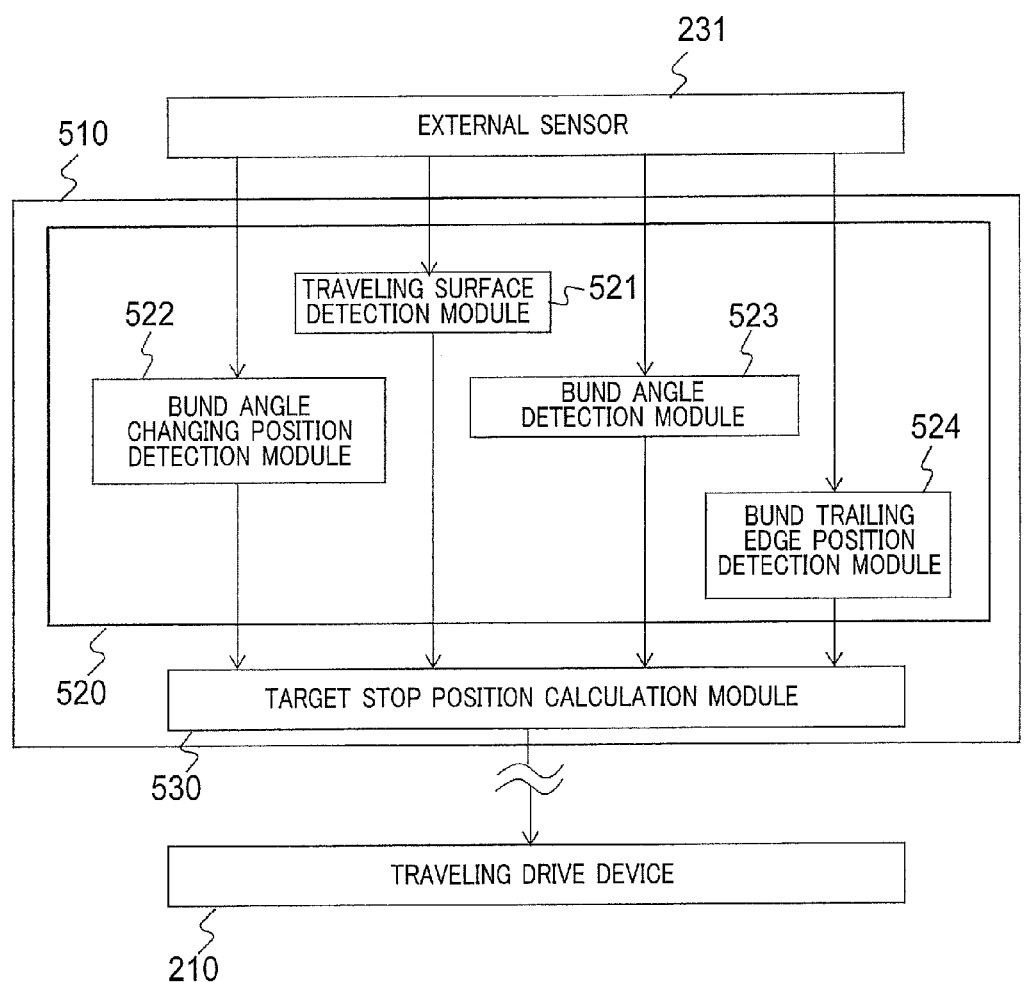
FIG. 8 is a block diagram showing a stop position determining module shown in FIG. 7.

Next, the details of the stop position determining module 510 will be described. FIG. 8 is a block diagram showing the details of the stop position determining module 510. As shown in FIG. 8, the stop position determining module 510 is provided with an obstacle identification module (bund identification module) 520 for identifying an obstacle (the vehicle ahead, the bund 400 or the like) on the traveling surface based on the information from the external sensor 231 and a target stop position calculation module 530 for calculating a target stop position SP for the dump truck 20.

The obstacle identification module 520 includes a traveling surface detection module 521 for detecting the traveling surface for the dump truck 20, a bund angle changing position detection module 522 for detecting a position at which a wall surface 400*a* of the bund 440 changes in angle, a bund angle detection module (bund angle calculation module) 523 for detecting the angle of the wall surface 400*a* of the bund 400, and a bund trailing edge position detection module 524 for detecting a trailing edge position of the bund 400.

Figure 9:
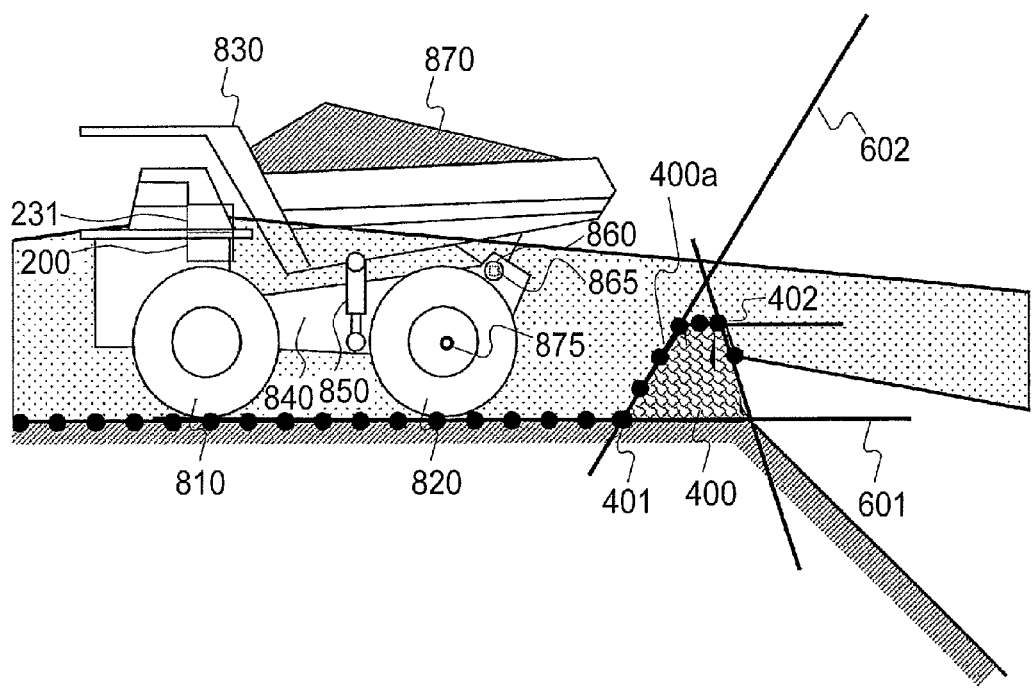
FIG. 9 is an illustration showing the state that an external sensor detects a bund.

FIG. 9 is an illustration showing the state that the external sensor 231 detects the bund 400. As shown in FIG. 9, the external sensor 231 is constituted by, for example, a laser sensor and is configured to be able to measure distances to a plurality of points within a measuring range of the external sensor 231. More specifically, FIG. 9 shows the state that the external sensor 231 is two dimensional in measuring range and takes as the measuring range an area covering the front to rear sides at the lower side of the dump truck 20.

The traveling surface detection module 521 determines a traveling surface 601 based on a sequence of measured points on a surface on which the dump truck 20 travels. More specifically, the traveling surface detection module 521 calculates the traveling surface 601 by using a sequence of measured points at a predetermined area, for example, between the front wheels 810 and the rear wheels 820 to compute an approximate straight line from the sequence of measure points.

The bund angle changing position detection module 522 calculates a first bund angle changing position 401 at which the sequence of measured points change from the traveling surface 601. Where a plurality of changing points are detected, the bund angle changing position detection module 522 calculates the bund angle changing positions up to the n-th.

The bund angle detection module 523 calculates an angle θ (refer to FIG. 11; hereafter, this angle will be called "leading edge angle") that the straight line of the traveling surface 601 makes with a line 602 (wall surface 400*a*) following the angle change at the angle change position detected by the bund angle changing position detection module 522.

The bund trailing edge position detection module 524 detects a bund peak from the fluctuation in the sequence of measured points and then, further detects a position at which the sequence of measured points turns downward in the vertical direction, to detect the position as a bund trailing edge position 402. Further, where the measured points do not change vertically downward, the bund trailing edge position detection module 524 detects as the bund trailing edge position 402 a position defined by the rearmost one of the measured points on the bund peak.

The target stop position calculation module 530 determines a target stop position SP for the dump truck 20 based on output values from the traveling surface detection module 521, the bund angle changing position detection module 522, the bund angle detection module 523 and the bund trailing edge position detection module 524. Here, the target stop position SP is defined as the distance from the external sensor 231 in the horizontal direction. That is to say, configuration is so taken that when the distance from the external sensor 231 to the bund 400 in the horizontal direction becomes SP, the dump truck 20 is stopped with the stop position taking an appropriate position for earth discharging (refer to FIG. 11 and the like).

Figure 10:
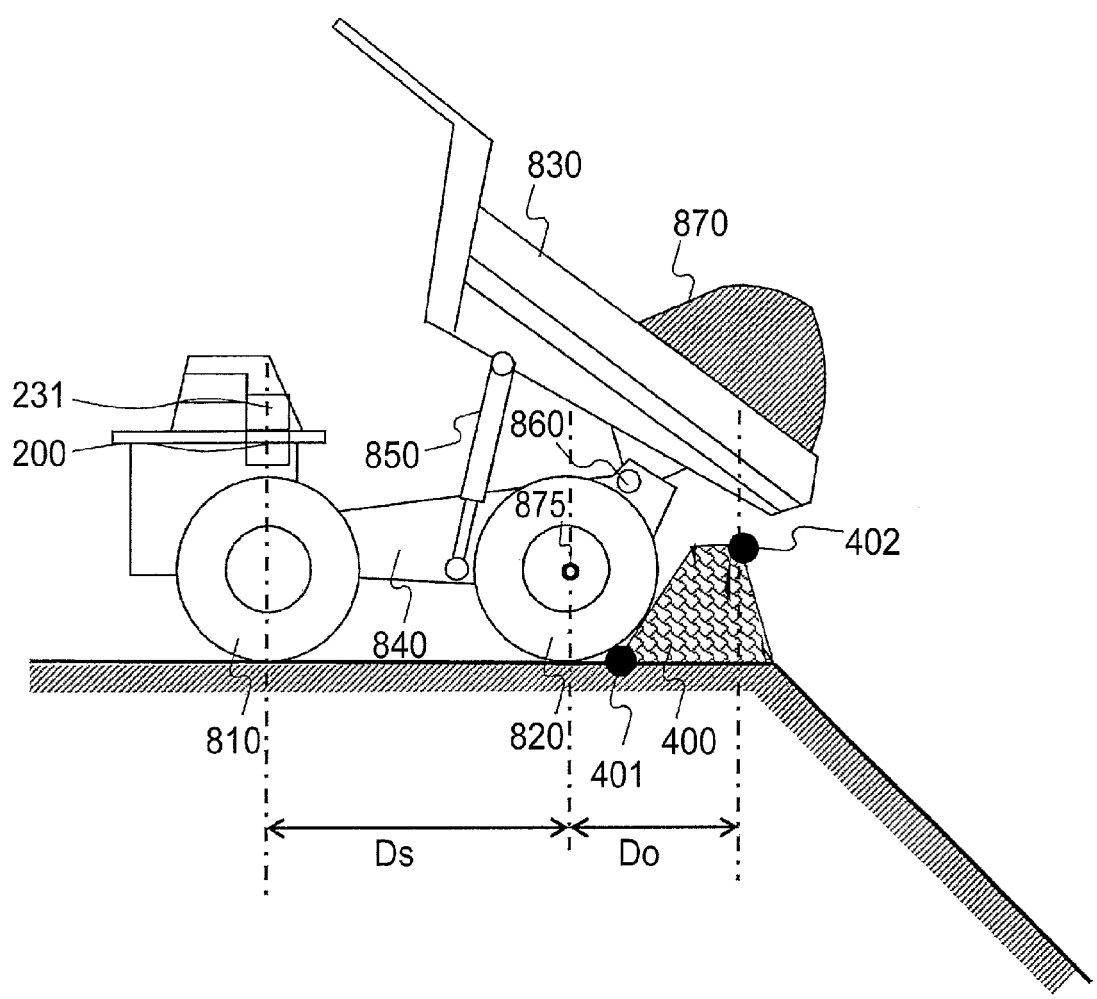
FIG. 10 is an illustration showing the state that the dump truck performs earth discharging.

FIG. 10 shows the state that the dump truck 20 performs earth discharging. Where discharging the load 870 toward the bottom of a scarp, the dump truck 20 goes backward and comes close to the bund 400 to stop there. In this state, the dump truck 20 tilts the vessel 830 by the control of the hoist cylinder 850 to discharge the load 870 loaded on the vessel 830 rearward. In FIG. 10, the symbol Ds represents a distance between the external sensor 231 and the center of the rear wheel axle 875 in the horizontal direction, and the symbol Do represents a distance between the center of the rear wheel axle 875 and the bund trailing edge position 402 in the horizontal direction.

Figure 11:
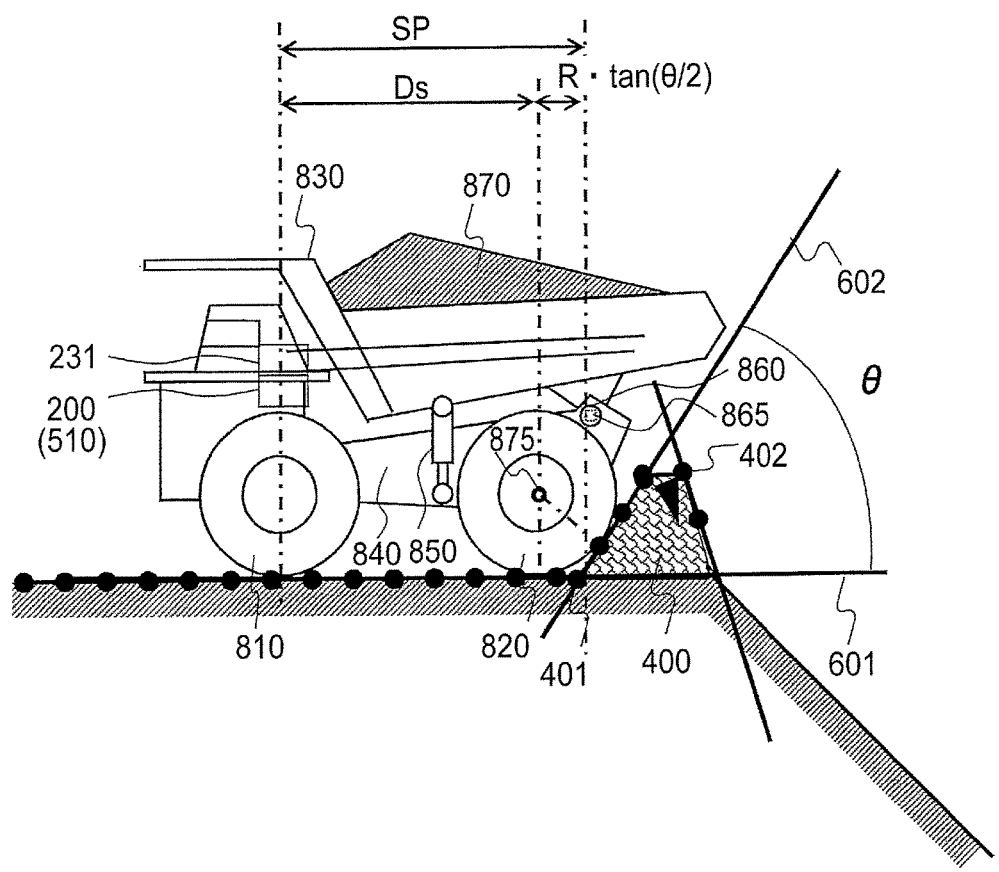
FIG. 11 is an illustration showing the state that the dump truck is in contact with the bund.

FIG. 11 shows the state that the dump truck 20 is in contact with the bund 400. As shown in FIG. 11, where the leading edge angle θ of the bund 400 is sufficiently large, the dump truck 20 is unable to go over the bund 400. Therefore, as shown in FIG. 11, it is desirable that the dump truck 20 stop at a position where the rear wheels 820 are in contact with the bund 400. At this time, it is possible to calculate the target stop position SP by performing geometric computations based on the angle θ detected by the bund angle detection module 523 and the radius R of the rear wheel tires.

That is, the rear wheels 820 come to a position just in contact with the bund 400 as a result of bringing the center of the rear wheel axle 875 to the position where the target stop position SP is away from the first bund angle changing position 401 by a distance of R*tan(θ/2). Therefore, the target stop position calculation module 530 determines as the target stop position SP a position at which the external sensor 231 is spaced from the first bund angle changing position 401 by a distance obtained by the calculation of Ds+R*tan(θ/2). The calculation may be made by the use of the diameter D of the rear wheel tires instead of the radius R.

Figure 12:
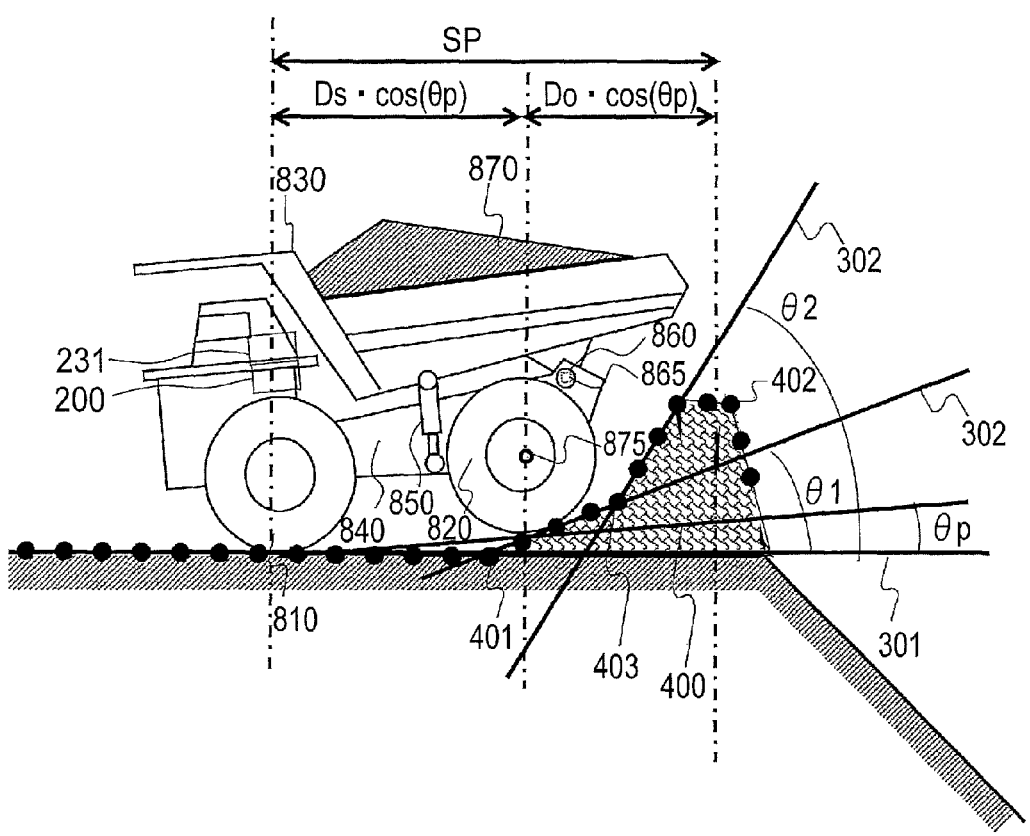
FIG. 12 is an illustration showing another example in which the dump truck stops at an earth discharging position.

Further, FIG. 12 shows another example where the dump truck 20 stops at the earth discharging position. In the example shown in FIG. 12, the bund 400 has angle changes of two or more steps. Specifically, a first bund angle changing position 401 is so slight in angle change as to be gone over by the dump truck 20, while a second bund angle changing position 403 is so large as not to be gone over by the dump truck 20.

In this example, the traveling control device 200 judges that the dump truck 20 is able to go over the first bund angle changing position 401, from a first bund angle (θ1) detected by the bund angle detection module 523 and continues the reverse travel. At this time, it is possible to detect a pitch angle θp by the use of the body sensor 232 for posture detection such as an IMU (Inertial Measurement Unit) provided on the dump truck 20. By the use of the pitch angle θp, the target stop position calculation module 530 calculates as the target stop position SP such a position that the center of the rear wheel axle 875 comes to a position where the vessel 830 reaches a position being beyond the bund trailing edge position 402 and determined by the expression Ds*cos(θp)+Do*cos(θp) compensating the aforementioned distances Do and Ds. Where a bund 400 of the angle which cannot been gone over is detected, the position at which the rear wheels 820 are in contact with the bund 400 is set as the target stop position SP similarly to the case described before.

Figure 13:
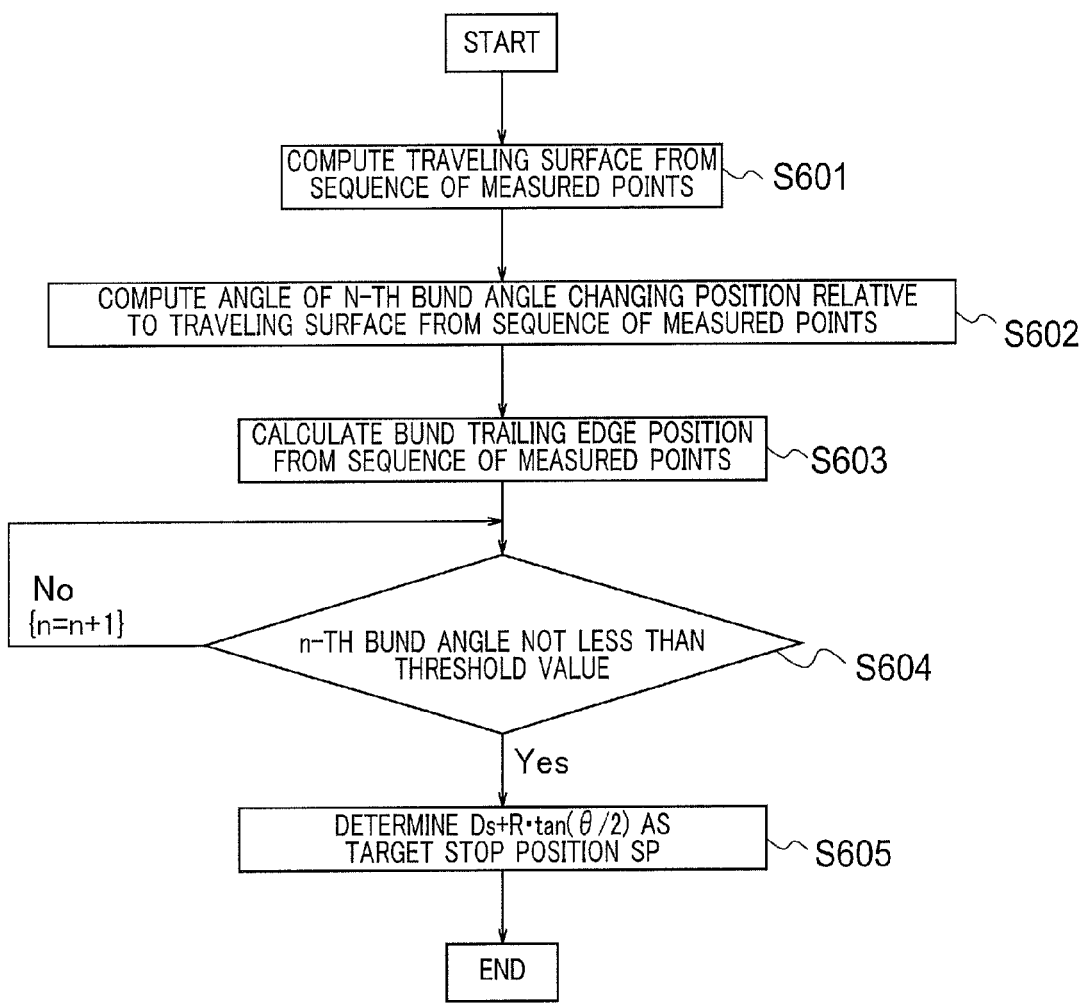
FIG. 13 is a flow chart showing processing steps taken by a stop position determining module in a first embodiment.

Next, the calculation procedure for the target stop position SP by the stop position determining module 510 will be described with reference to FIG. 13. FIG. 13 is a flow chart showing the processing steps of the stop position determining module 510.

At the step S601, the traveling surface detection module 521 computes the traveling surface 601 based on the sequence of measured points detected by the external sensor 231.

At the step S602, the bund angle changing position detection module 522 computes the first bund angle changing position 401 based on the sequence of measured points detected by the external sensor 231. Further, the bund angle detection module 523 computes the leading edge angle θ of the bund 400 based on the sequence of measured points detected by the external sensor 231. At this time, where the bund angle changing positions and the leading edge angles are paired plurally, computations are performed for all of the pairs.

At the step S603, the bund trailing edge position detection module 524 calculates the bund trailing edge position 402 based on the sequence of measured points detected by the external sensor 231.

At the step S604, the target stop position calculation module 530 judges whether or not the leading edge angle (bund angle) θ at the n-th bund angle changing position is equal to or larger than a threshold value. The threshold value herein is set at an angle of the degree that the dump truck 20 is unable to go over the bund 400. If the leading edge angle θ is equal to or larger than the threshold value, the bund angle concerned is judged to be unable to be gone over, and the step S605 is then reached. If the leading edge angle θ is smaller than the threshold value, return is made to the step S604. At this time, the first bund angle changing position 401 and the bund leading edge angle θ that are taken as objectives for computation are altered to those for the next (n+1th).

At the step S605, the target stop position calculation module 530 determines the target stop position Sp to such a position that the external sensor 231 is away from the first bund angle changing position 401 by a distance calculated by the expression Ds+R*tan(θ/2) (refer to FIG. 11).

As described above, according to the first embodiment, it is possible to identify the shape of the bund 400 and to stop the dump truck 20 at an appropriate position depending on the shape of the bund 400. More specifically, where the shape of the bund 400 is recognized as the shape that is unable for the dump truck 20 to go over, the target stop position SP is geometrically calculated from the slant angle of the wall surface 400a of the bund 400, and the dump truck 20 is stopped at the target stop position SP, whereby the rear wheels 820 are brought into such a close state as to be in contact or not with the wall surface 400a of the bund 400. Therefore, it is possible to stop the dump truck 20 at a position desired for the earth discharging operation. In addition, since the stop position can be calculated taking the shape of the bund 400 into consideration, it is possible to control the dump truck 20 to stop at an appropriate position even where the shape of the bund 400 is changed.

Second Embodiment

Next, description will be made regarding a dump truck 1020 on which a stop position determining module 1510 is mounted according to a second embodiment. The second embodiment is the same as the first embodiment except for the difference in the computation method that is executed by a target stop position calculation module 1530 for the target stop position SP, and hence, description will be focused on the difference.

Figure 14:
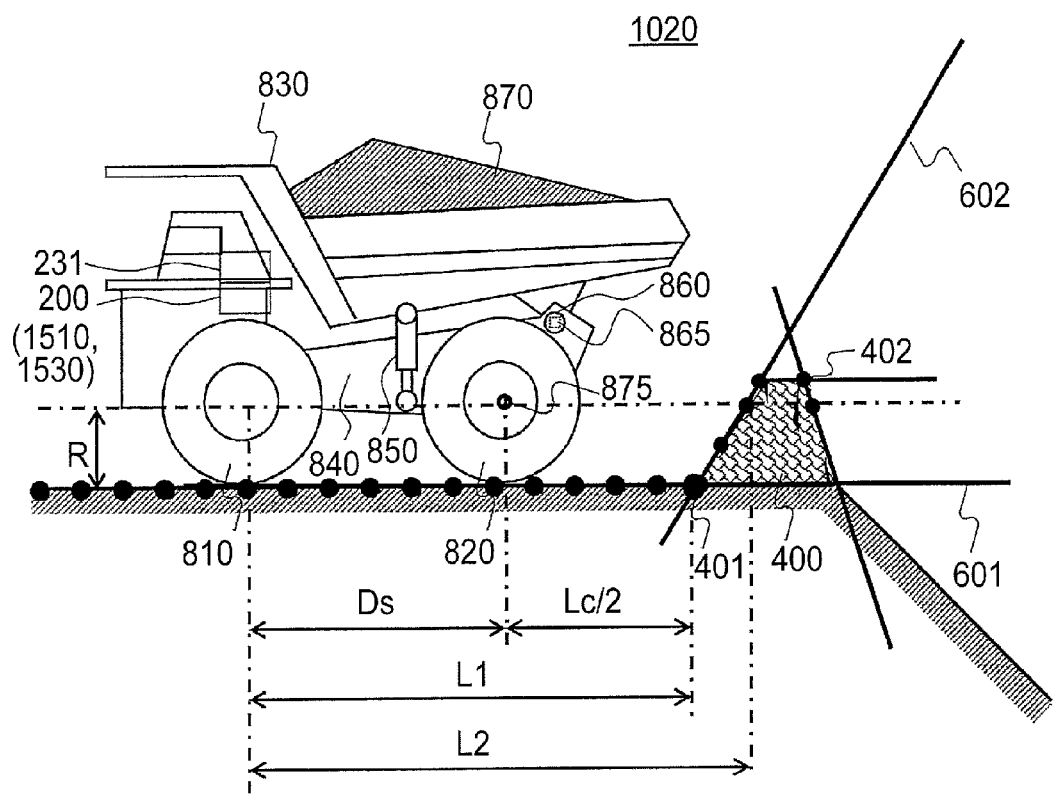
FIG. 14 is an illustration showing one example wherein the bund is formed by having earth and sand or the like piled up.

First of all, an example of FIG. 14 will be described. FIG. 14 shows the state that the dump truck 1020 is approaching the bund 400 for earth discharging. In the figure, the symbol R represents the radius of the rear wheels 820, and the symbol Ds represent a horizontal distance from the external sensor 231 to the center of the rear wheel axle 875. Further, the symbol L1 is defined as a measured distance to the first bund angle changing position 401 detected by the external sensor 231. Because the bund 400, where formed through the stacking of earth and sand or the like as shown in the figure, is approximately determined by an angle called repose angle that enables the shape to be kept stably without the collapse of the earth and sand, the reading edge of a slope face of the bund 400 often becomes relatively gentle in angle even though depending on the property of earth and sand material and generally, often becomes smaller than 40 degrees.

Figure 15:
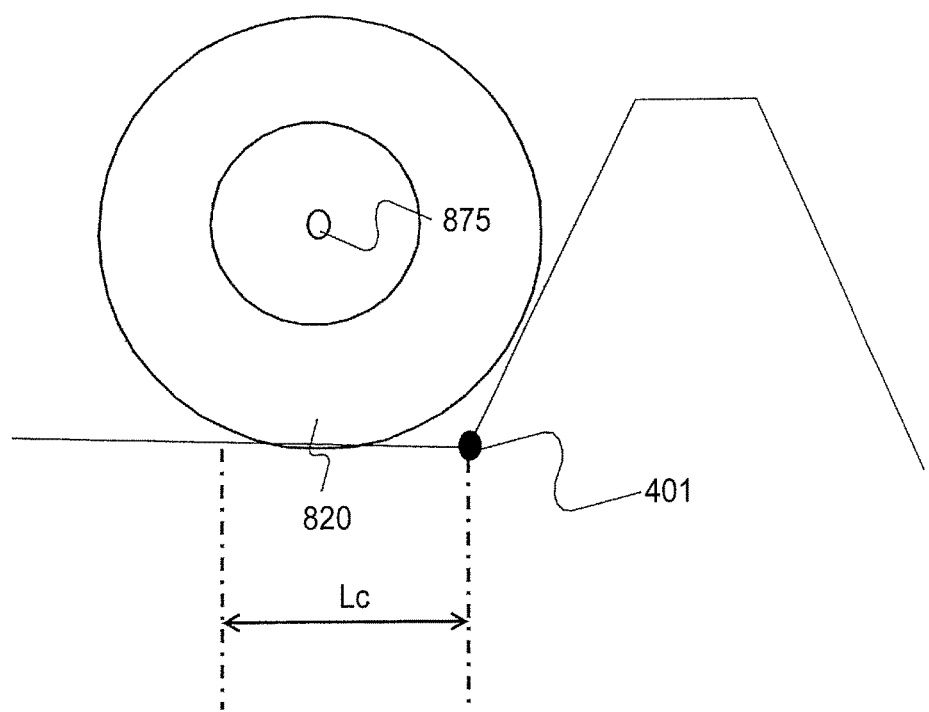
FIG. 15 is an illustration showing the relation between rear wheels and the stop position in the case of the bund shown in FIG. 14.

In this case, it is possible to stop the vehicle with the rear wheels 820 drawn close to the first bund angle changing position 401 of the bund 400. As shown in FIG. 15, the rear wheels 820 support the dead load with the tire rubber yielding and thus, have a ground-contact length represented as Lc. Thus, in order to make the rear wheels 820 come as close to the bund 400 as possible, it is reasonable as understood from the figure to set as a target a position where the rear wheel axle 875 is before the first bund angle changing position 401 of the bund 400 by the length of Lc/2. That is, it is desirable to set as the target stop position SP a position satisfying the relation L1=Ds+Lc/2 in FIG. 14. Therefore, the target stop position calculation module 1530 of the stop position determining module 1510 in the second embodiment determines as the target stop position SP a position at which the external sensor 231 is apart from the first bund angle changing position 401 by the distance L1. Herein, the symbol Lc is a value that is determined by the kind and air pressure of the tires and the axle weight, but may be determined by a function of the gross weight for each model of the dump truck 20 or simply by a constant depending on each model.

Figure 16:
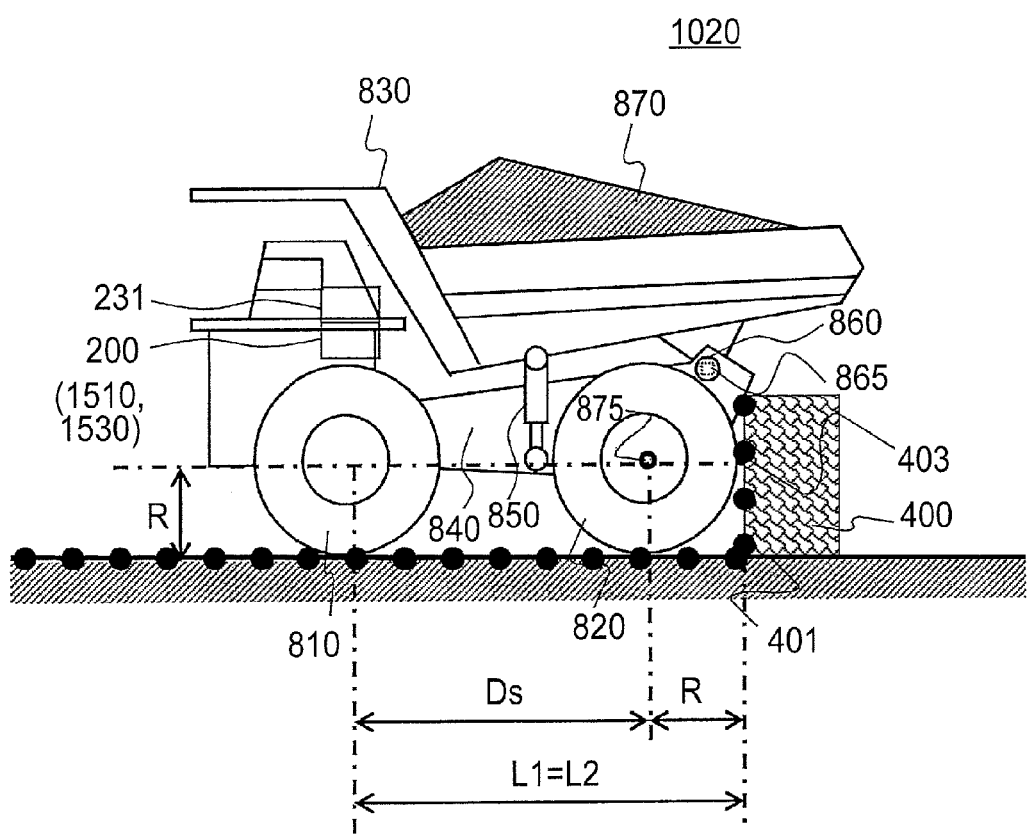
Figure 17:
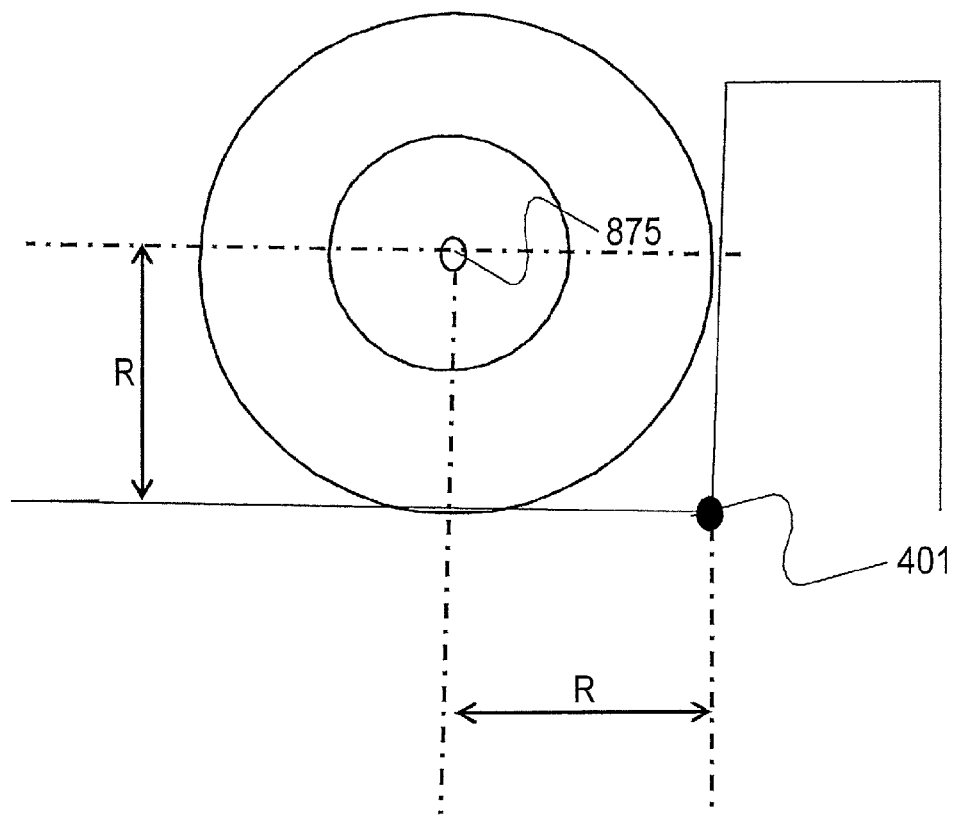
FIG. 17 is an illustration showing the relation between the rear wheels and the stop position in the case of the bund shown in FIG. 16.

On the other hand, in an example shown in FIG. 16, a bund 400 is constructed by concrete or the like and is provided to be perpendicular to the ground. That is, as shown in FIG. 17, the part of the rear wheels 820 to be first brought into contact with the bund 400 is the part of the rear wheels 820 projecting most rearward, namely, the part at the height of the rear wheel axle 875, and the projecting amount from the rear wheel axle 875 is the symbol R representing the radius of the rear wheels 820. That is, where the symbol L2 represents the distance measured from the external sensor 231 to a bund position 403 at the height of the rear wheel axle 875, it is desirable to set as the target stop position SP a position that makes the symbol L2 in FIG. 16 equal to the sum Ds+R.

In this way, the distance to attain a stop target changes in dependence on the shape of the bund 400, and thus, in order to judge which of the example shown in FIG. 14 and the example shown in FIG. 16 is the case, it is suitable to judge whether or not the rear end of the rear wheels 820 can project beyond the first bund angle changing position 401. Therefore, important is the position 403 of the bund 400 at the height of the rear wheel axle 875 which corresponds to the part of the rear wheels 820 projecting most rearward, and such judgment can be done by comparing the measured distance L2 from the external sensor 231 to the bund position 403 at the height of the rear wheel axle 875 in FIG. 14 or FIG. 16 with the measured distance L1 from the external sensor 231 to the first bund angle changing position 401.

Figure 18:
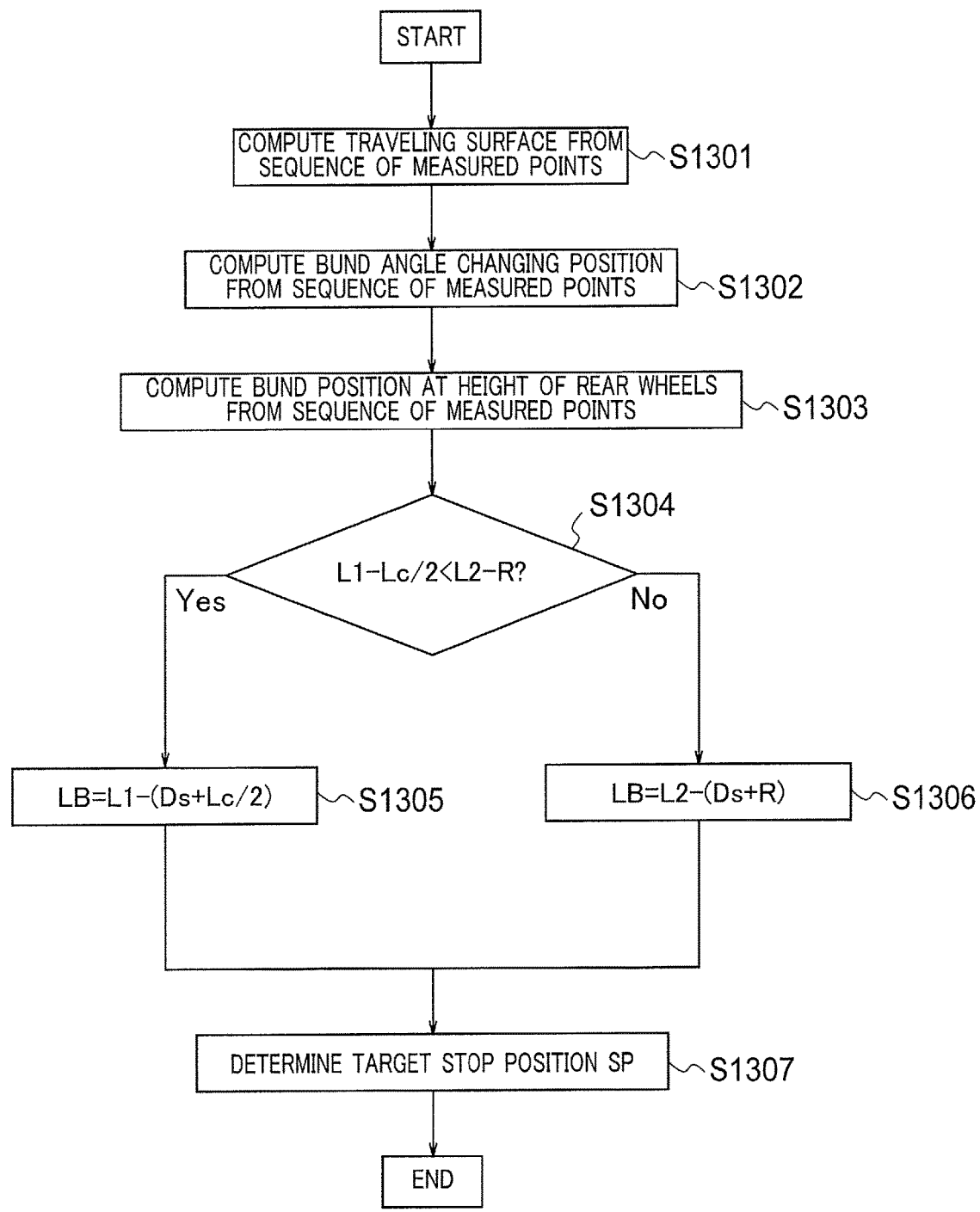
FIG. 18 is a flow chart showing processing steps taken by a stop position determining module in a second embodiment.

Specifically, of the rear end on the ground-contact surface of the rear wheels 820 and the rear end of the rear wheels 820 at the height of the rear wheel axle 875, the distance to either one that is earlier brought into contact with the bund 400 is set as a stop target. That is, the object can be attained by judging whether the distance L1 detected by the external sensor 231 reaches the sum Ds+Lc/2 or the distance L2 reaches the sum Ds+R and by effecting the stop when either one of them is attained earlier. FIG. 18 shows a calculation procedure for the target stop position SP which includes parts for the judgment shown here.

At the step S1301, the traveling surface detection module 521 computes the traveling surface 601 from the sequence of measured points detected by the external sensor 231.

At the step S1302, the bund angle changing position detection module 522 computes the first bund angle changing position 401 based on the sequence of measured points detected by the external sensor 231. The target stop position calculation module 1530 calculates the distance L1 from the first bund angle changing position 401.

At the step S1303, the bund angle detection module 523 computes the leading edge angle θ of the bund 400 based on the sequence of measured points detected by the external sensor 231. The target stop position calculation module 1530 calculates the distance L2 from the external sensor 231 to the position 403 at the height of the radius R of the tires based on the leading edge angle θ and the tire radius R.

At the step S1304, the target stop position calculation module 1530 executes the step S1305 if the relation L1−Lc/2<L2−R is true, but executes the step S1306 if the relation is false.

At the step S1305, setting is done to make the reverse distance LB=L1−(Ds+Lc/2).

At the step S1306, setting is done to make the reverse distance LB=L2−(Ds+R).

At the step S1307, the target stop position calculation module 1530 determines the target stop position SP based on the reverse distance LB.

As described above, according to the second embodiment, in the same manner as the first embodiment, it is possible to identify the shape of the bund 400 and to stop the dump truck 1020 at an appropriate position depending on the shape of the bund 400. Accordingly, it is possible to stop the dump truck 1020 at a desired position for the earth discharging operation. Moreover, even where the shape of the bund 400 is changed, it is likewise possible to move the dump truck 1020 to an appropriate earth discharging position.

It is to be noted that the present invention is applicable to other transport vehicles than the dump trucks, for example, to wheel loaders and the like.

What is claimed is:

1. A traveling control device for a transport vehicle, comprising:
   a processor; and
   a memory connected to the processor and which stores instructions that cause the processor to execute:
   a bund identification module that identifies the shape of a bund provided on a traveling surface based on information from an external sensor provided on the transport vehicle, and
   a target stop position calculation module that calculates a target stop position for the transport vehicle based on the shape of the bund identified by the bund identification module,
   wherein the bund identification module includes a bund angle calculation module that calculates an angle θ which a wall surface on a side facing the transport vehicle of wall surfaces of the bund makes with the traveling surface, and
   wherein the target stop position calculation module calculates the target stop position for the transport vehicle which is away from the bund by a distance calculated by $Ds+R*\tan(\theta/2)$, where R is a radius of a tire of the transport vehicle and Ds is a horizontal distance between the external sensor and a center of a rear wheel axle of the transport vehicle.

* * * * *